(12) United States Patent
Herbold

(10) Patent No.: US 6,865,958 B2
(45) Date of Patent: Mar. 15, 2005

(54) TORQUE TESTING DEVICE

(75) Inventor: Siegfried Herbold, Wuppertal (DE)

(73) Assignee: Eduard Wille GmbH & Co KG, Wuppertal (DE)

( * ) Notice: Subject to any disclaimer, the term of this patent is extended or adjusted under 35 U.S.C. 154(b) by 0 days.

(21) Appl. No.: 10/616,798

(22) Filed: Jul. 9, 2003

(65) Prior Publication Data

US 2004/0007082 A1 Jan. 15, 2004

(30) Foreign Application Priority Data

Jul. 9, 2002 (DE) .................................... 202 10 645 U

(51) Int. Cl.⁷ .............................................. G01L 3/00
(52) U.S. Cl. ................................................. 73/862.046
(58) Field of Search ...................... 73/862.326, 862.29, 73/862.045, 862.046

(56) References Cited

U.S. PATENT DOCUMENTS

| | | | |
|---|---|---|---|
| 3,979,942 A | | 9/1976 | Grabovac |
| 4,444,061 A | * | 4/1984 | Mathias .................... 73/862.06 |
| 4,471,663 A | * | 9/1984 | Wallace ................. 73/862.339 |
| 4,823,618 A | * | 4/1989 | Ramming .............. 73/862.045 |
| 4,976,133 A | * | 12/1990 | Pohl ............................ 73/1.11 |
| 5,009,110 A | * | 4/1991 | Lang et al. ............. 73/862.322 |
| 5,501,110 A | * | 3/1996 | Peilloud et al. ......... 73/862.321 |
| 5,648,617 A | | 7/1997 | Cullen et al. |
| 5,731,529 A | * | 3/1998 | Nicot ..................... 73/862.326 |
| 6,227,060 B1 | * | 5/2001 | Nicot et al. .............. 73/862.08 |
| 6,269,702 B1 | * | 8/2001 | Lambson ............... 73/862.045 |
| 6,418,797 B1 | | 7/2002 | Ambrosina et al. |
| 6,427,542 B1 | | 8/2002 | Nicot |
| 6,644,135 B1 | * | 11/2003 | Kishimoto et al. ..... 73/862.338 |

FOREIGN PATENT DOCUMENTS

| | | |
|---|---|---|
| DE | 44 30 503 C1 | 2/1996 |
| DE | 197 19 921 A1 | 12/1997 |
| DE | 196 27 385 A1 | 1/1998 |
| DE | 101 14 688 C1 | 3/2002 |
| DE | 202 09 850 U1 | 10/2002 |
| EP | 03210447 | 9/1991 |

* cited by examiner

Primary Examiner—Edward Lefkowitz
Assistant Examiner—Takisha Miller
(74) Attorney, Agent, or Firm—Mallinckrodt & Mallinckrodt

(57) ABSTRACT

The invention relates to a testing device for measuring torques with a sensor for generating electrical signals in response to exerted torques, and signal processing means, to which the electrical signals are applied and which provide measuring values of the exerted torque. The invention provides a plurality of measuring heads, which either may have different measuring ranges or may be adapted to different tools to be tested. Each of these measuring heads has its own signal processing means. The signal processing means are calibrated in the same way, such that the torque measuring data of different measuring heads can be compared with each other. When calibrating a measuring head, the individual signal processing means can also be adjusted to take individual non-linearities of the torque sensors into account. The measuring heads can then simply be connected in parallel with the display or evaluation means. If a torque is exerted on anyone of the measuring heads, this torque will automatically be displayed or evaluated with the correct calibration.

7 Claims, 6 Drawing Sheets

TORQUE TESTING DEVICE

The invention relates to a testing device for measuring torques comprising sensor means for generating electrical signals in response to exerted torques, and signal processing means, to which the electrical signals are applied and which provide measuring values of the exerted torque.

BACKGROUND OF THE INVENTION

Such measuring heads are, for example, to be used to calibrate torque wrenches. The sensor means, conventionally, have strain gages. These strain gages are cemented to parts which are deformed by the torque to be measured. Such strain gages provide weak, analog signals. Usually, these analog signals are not exactly proportional to the torque exerted on the torque sensor. Therefore, signal processing is necessary to obtain a signal which exactly represents the torque. This signal is displayed by display means or is otherwise supplied to evaluation means, for example, for determining the variation in time or the statistical distribution of the torques.

Each torque sensor has a limited measuring range, in which it operates optimally. Therefore, different measuring heads with correspondingly different torque sensors are provided. These different measuring heads are connected to the display or evaluation means or are applied thereto through a selector switch.

Usually, the signal processing for generating a signal which exactly represents the torque is effected in the evaluation means. This seems to be reasonable, in particular if a plurality of torque sensors can optionally be connected to the display or evaluation means. Then, the signal processing means need be provided only once.

The transmitting of the analog signal to the display or evaluation means involves the risk of the signal being falsified by interferences. Expensive shielding measures are required.

Connecting or switching measuring heads to the display or evaluation means is complex and may result in operating errors.

DISCLOSURE OF THE INVENTION

It is an object of the invention to design a testing device of the type mentioned in the beginning such that torques can be measured over a large measuring range.

It is another object of the invention to design a testing device of the type mentioned in the beginning such that interferences are avoided.

It is still another object of the invention to design a testing device of the type mentioned in the beginning such that the risk of operating errors is minimized.

To this end, the testing device has a plurality of measuring heads, each of which has a torque sensor. Each measuring head comprises separate, individual signal processing means, which are arranged in the measuring head in close proximity of the respective torque sensor. The torque measuring data appearing at all the measuring head signal outputs are calibrated in the same way. The measuring head signal outputs of all measuring heads are applied directly, in parallel to display or evaluation means.

Thus, the invention provides a plurality of measuring heads, which either may have different measuring ranges or may be adapted to different tools to be tested. Each of these measuring heads has its own signal processing means. The signal processing means are calibrated in the same way, such that the torque measuring data of different measuring heads can be compared with each other. A certain torque T acting on one measuring head provides the same torque data at the measuring head signal output of this measuring head as the torque T would provide at the measuring head signal output of another measuring head. 1 Nm (Newton meter) at one measuring head would provide also 1 Nm at the other measuring head. When calibrating a measuring head, the individual signal processing means can also be adjusted to take individual non-linearities of the torque sensors into account. The measuring heads can then simply be connected in parallel with the display or evaluation means. If a torque is exerted on any one of the measuring heads, this torque will automatically be displayed or evaluated with the correct calibration. The use of individual signal processing means in each measuring head represents an additional expenditure. This expenditure is, however, largely compensated for by saving expensive measures for shielding or suppression of interferences and by saving selector switch means. The invention offers the advantage of simplified handling and reduction of the risk of operational errors.

Preferably, the signal processing means comprise an A/D-converter for converting analog signals of the torque sensor into digital data, these digital data, after further digital signal processing, if necessary, appearing at the measuring head signal output. The digital data permit largely undisturbed transmission also to remote display or evaluation means. In particular, means can be provided for the wireless transmission of data appearing at the measuring head signal output to the display or evaluation means.

At least one measuring head may be part of a torque wrench.

In a preferred embodiment, at least one of said measuring heads comprises a stationary housing, said torque sensor comprising an outer annular body fixedly retained in said housing, an inner annular body connected with said outer annular body through webs, a driving part permitting exerting of a torque thereon and attached to said inner annular body, and measuring pick-up means responding to deformation of said webs under the action of said torque. Said signal processing means comprise a printed circuit board, on which components of said signal processing means are mounted, said printed circuit board having a central aperture therethrough, said printed circuit board being arranged in a shallow cavity within said outer portion annular body above said inner annular body and said webs and being attached to said inner annular body. Said driving part extends through said central aperture of said printed circuit board.

Embodiments of the invention are described hereinbelow with reference to the accompanying drawings.

PREFERRED EMBODIMENT OF THE INVENTION

Figure 1:
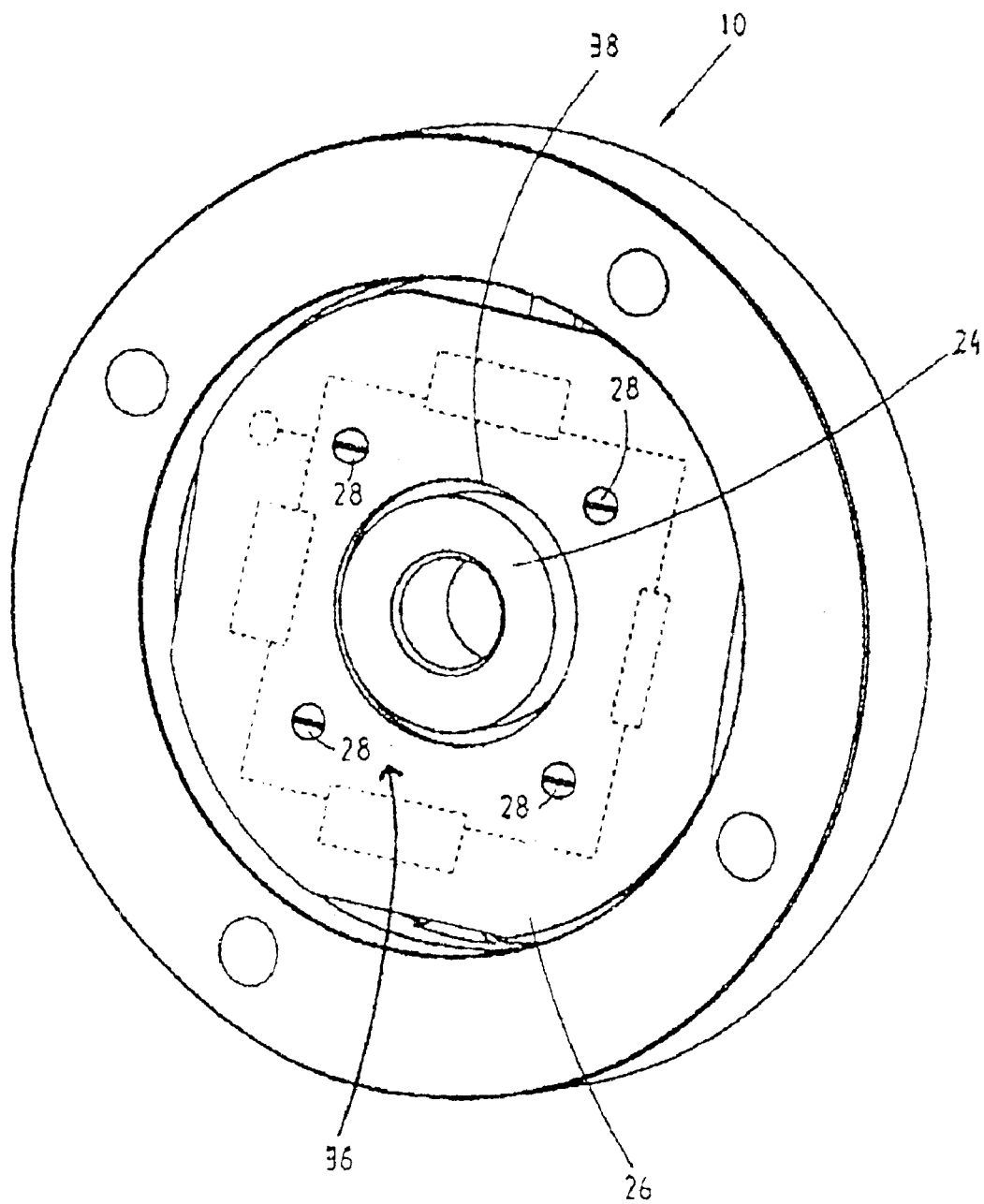
FIG. 1 is a schematic-perspective illustration and shows a torque sensor, to which a printed circuit board carrying signal processing means is attached.
Figure 2:
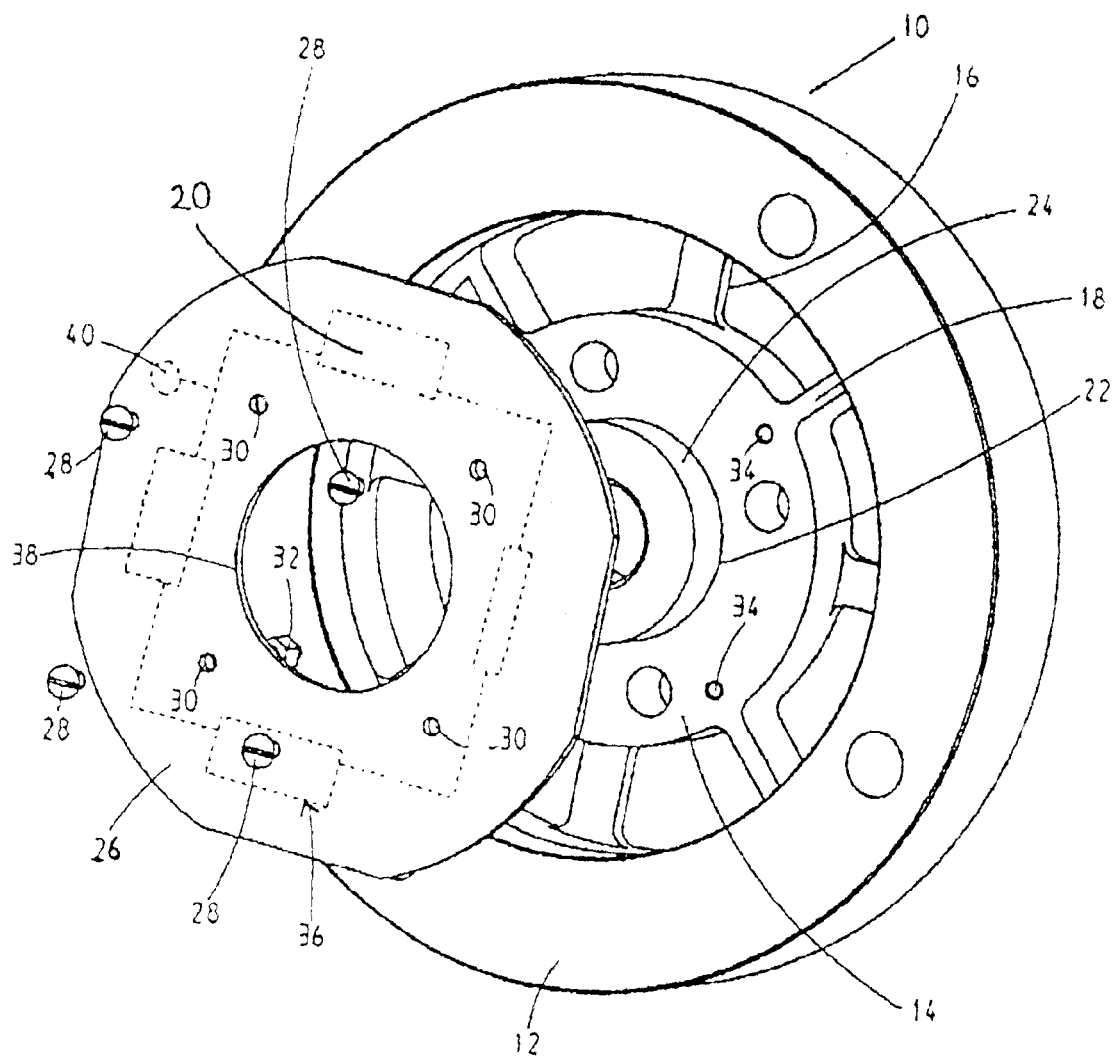
FIG. 2 is an exploded, schematic-perspective view similar to FIG. 1.

Referring to FIGS. 1 and 2, numeral 10 generally designates a torque sensor. As can be seen best from FIG. 2, the torque sensor 10 comprises an outer annular body 12 and an inner annular body 14. Outer and inner annular bodies 12 and 14, respectively, are interconnected by radial webs 16 and 18. The webs 16 have relatively large width in circumferential direction but have relatively small axial dimensions. The axial dimensions of the webs 16 are substantially smaller than the axial thickness of the outer annular body 12. The webs 18 are narrow in circumferential direction but extend, in axial direction, through nearly the whole thickness of the outer annular body. Wide and narrow webs 16 and 18, respectively, alternate. The webs 16 and 18 are arranged in regular arrangement with an annular offset of 45° between each pair of neighboring webs 16 and 18, whereby a cross of four wide webs 16 is formed, which are angularly spaced by 90°. The wide webs 18 carry strain gages 20, which are arranged in a bridge circuit.

Such a torque sensor is described in DE 202 09 650 U1, the contents of which is incorporated herein by reference. A driving part 24 is affixed in the central aperture 22 of the inner annular body 14. A tool (not shown) can engage this driving part 24 to exert the torque to be measured.

The front face, as viewed in FIG. 2, of the inner annular body 14 and the front faces of the webs 16 and 18 lie in one plane which is offset to the inside relative to the plane of the front face of the outer annular body. In this way, a shallow cavity is defined within the outer annular body and in front of the inner annular body 14. A printed circuit board 26 is retained in this cavity. The printed circuit board 26 is attached to the inner annular body 14 by screws 28. To this end, the printed circuit board 26 has screw holes 30. The screws 28 pass through the screw holes 30 and spacers 32 and are screwed into threaded bores 34 of the inner annular body 14. Thereby, the printed circuit board 26 is held at a distance from the inner annular body 14 and the webs 16 and 18. The printed circuit board 26 carries, on its backside facing the annular body 14, the components of the signal processing means schematically indicated in dashed lines in FIGS. 1 and 2. The signal processing means are generally designated by 36 in FIGS. 1 and 2.

Figure 6:
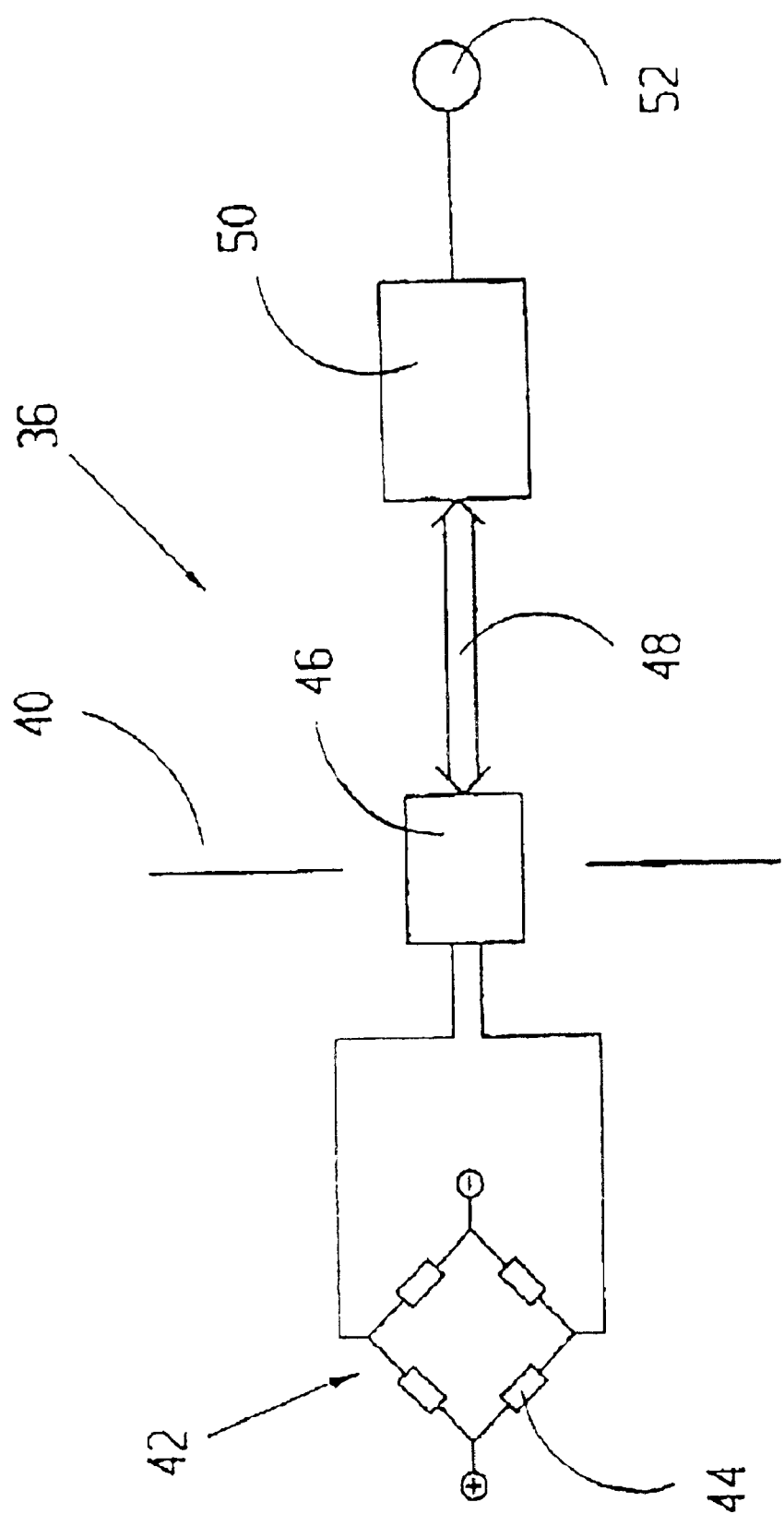
FIG. 6 is a block diagram of the signal processing means.

The signal processing means 36 are illustrated in FIG. 6. Referring to FIG. 6, the measuring pick-up 42 and the analog portion of the signal processing means 36 are shown on the left of the line 40, and the digital portion of the signal processing means is shown on the right of the line 40. The measuring pick-up 42 is a bridge circuit of strain gages 44. The strain gages 44 are cemented on the wide webs 16. When a torque is exerted, the strain gages will be stressed by shearing action. Thereby, they change their resistances. The strain gages 44 in the bridge circuit 42 provide a weak analog signal. This analog signal is applied to an integrated circuit 46. The integrated circuit 46 is mounted on the backside of the printed circuit board 26. There are short transmission paths between the measuring pick-up 42 and the integrated circuit 46. Thereby, interferences are minimized. The integrated circuit 46 is a combination of pre-amplifier and A/D-converter. The pre-amplifier raises the weak anolog signal to the level required for the A/D-conversion. The A/D-converter generates digital measuring data representing the analog signal. These digital measuring data are applied to an integrated circuit 50 through a bus 48. The integrated circuit 50 converts the measuring data on the bus 48 to a digital signal, which represents the exerted torque in Nm or mNm. The integrated circuit compensates for zero offset and non-linearities. In addition, an adjustment for calibration can be effected. Then, at a measuring head signal output 52, a digital signal is obtained, which directly represents the torque in Nm or mNm.

Instead, the integrated circuit may also be designed such that the measuring head provides the maximum torque value of a torque pulse.

Figure 3:
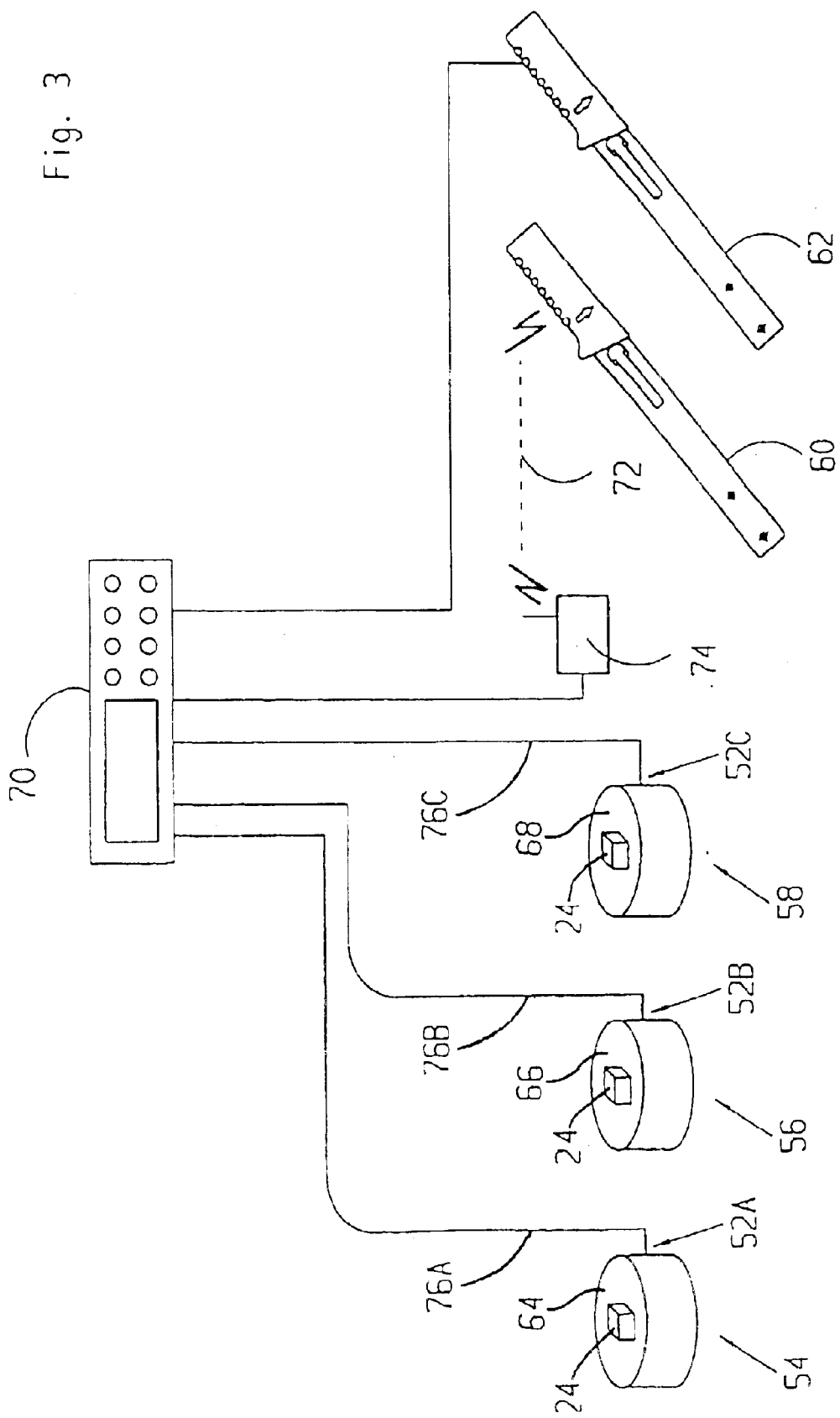
FIG. 3 is a schematic illustration of a testing device having a plurality of measuring heads and one single display device common to all measuring heads.

FIG. 3 illustrates a testing device having three measuring heads 54, 56 and 58 of the type described above and two torque wrenches 60 and 62, each of which also has a torque sensor with signal processing means in accordance with FIG. 6. In the measuring heads 54, 56 and 58, the respective outer annular body 12 of the torque sensor 10 is fixedly retained in a stationary housing 64, 66 and 68, respectively. The measuring heads 54, 56, 58 and torque wrenches 60 and 62 are all connected directly, i.e. without further signal processing, in parallel with a display device 70. The digital measuring data of the torque wrench 60 are applied in wireless form. This is indicated by the dotted connection 72. The display device 70 is connected with a receiver 74. Also this should be covered by the term "directly".

Measuring head 54 is a measuring head for the testing of impact screw drivers. Torques are exerted pulse-like as consecutive impacts. The signal processing means of the measuring head are designed to provide, at the measuring head signal output 52A, a digital torque measuring signal which represents the maximum torque occurring during the torque pulse. This torque measuring signal is applied to the display device 70 through a data line 76A.

The measuring heads 56 and 58 provide digital torque measuring data in different measuring ranges at measuring head signal outputs 52B and 52C, respectively. The different measuring ranges are achieved by making the webs 16 of the different torque sensors differently stiff, thus, for example, by making the webs 16 differently thick. The torque measuring data are applied, in parallel to each other and to the torque measuring data from the measuring head 54, to the display device 70 through data lines 76B and 76C, respectively.

Alternatively, the measuring heads 56 and 58 may be designed for identical measuring ranges, while, however, the driving parts 24 are different for adapting them to different torque tools.

The different measuring heads 54, 56, 58 and torque wrenches 60, 62 are calibrated all in the same way: Equal torques generate equal torque measuring data at the various measuring heads.

Figure 4:
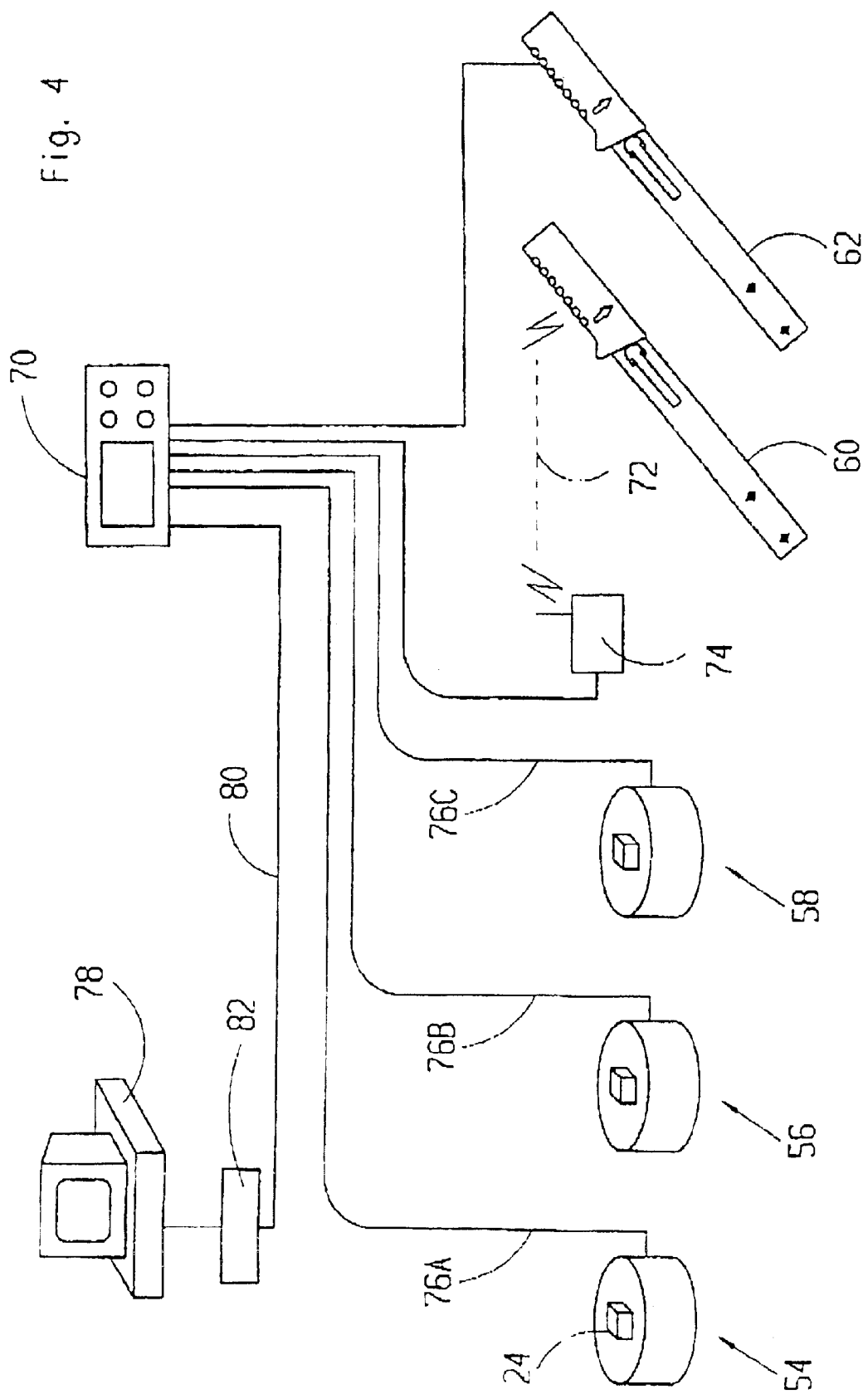
FIG. 4 is a schematic illustration similar to FIG. 3 of a testing device having display and evaluating means.

FIG. 4 is substantially identical with FIG. 3 described above. Corresponding elements bear the same reference numerals as in FIG. 3.

In the embodiment of FIG. 4, a computer 78 such as a laptop is provided in addition to the simple display device 70. The respective digital torque measuring signal applied to the display device 70 is applied also to this computer 78 through a data line 80 and a level converter 82. The computer 78 represents evaluating means for evaluating the measured torques. Thus, the computer 78 may, for example, track the variation in time of a torque exerted through a torque wrench and may detect the position of a kink in the torque-versus-time characteristic appearing, when the torque wrench is released. The torque measuring data may also be collected and evaluated statistically.

Figure 5:
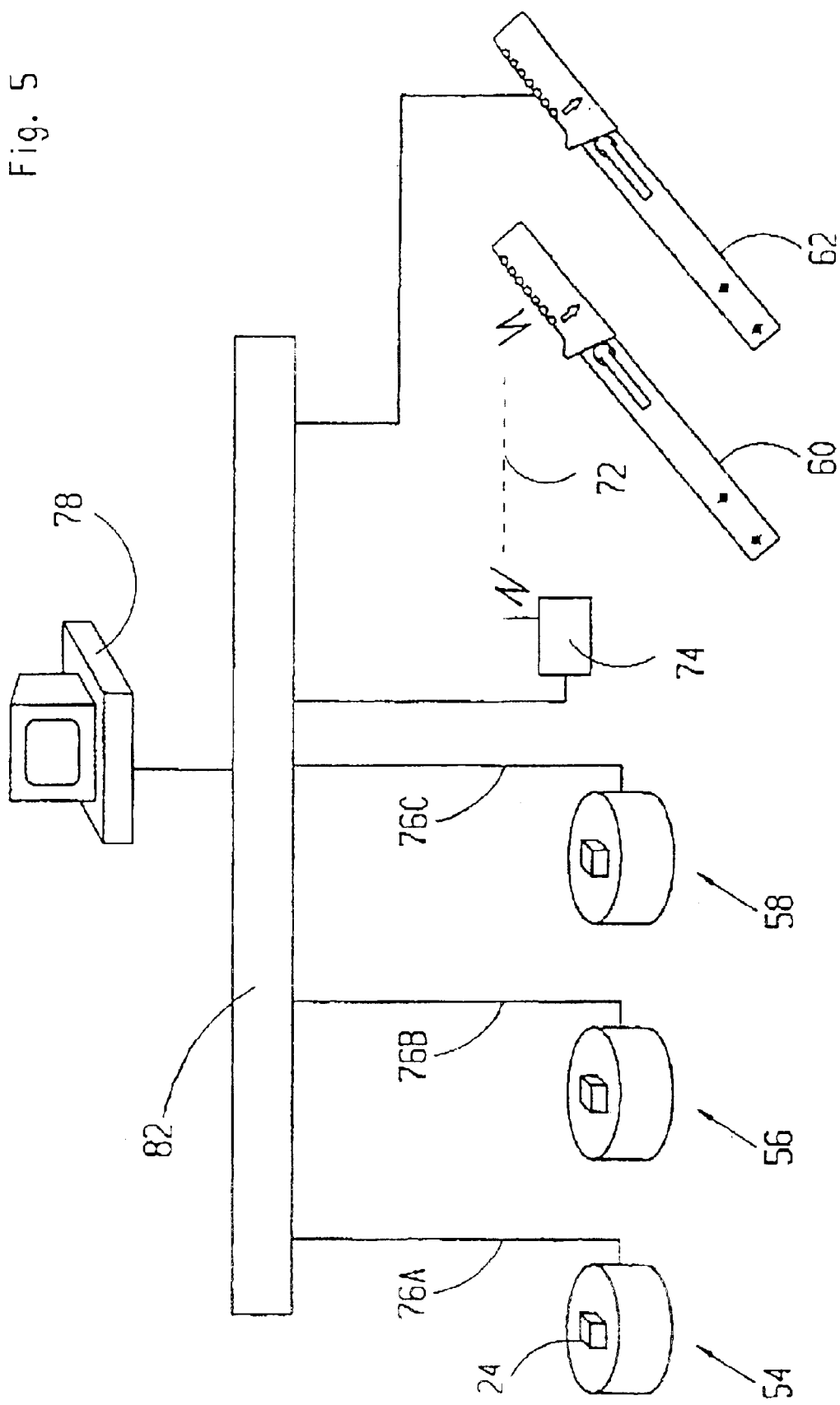
FIG. 5 is a schematic illustration similar to FIGS. 3 and 4 and shows a testing device wherein a computer with screen is provided for display and evaluation.

FIG. 5 also is similar to FIGS. 3 and 4. Corresponding elements, again, bear the same reference numerals as in FIGS. 3 and 4. No display device is provided, in the testing device of FIG. 5, but a computer only. All measuring head signal outputs 52A, 52B, 52C and the outputs of the torquers 60 and 62 are applied to the computer 78 through level converter 82. The screen of the computer 78 fulfills the function of the display device 70.

I claim:

1. A testing device for testing torque wrenches, comprising a plurality of measuring heads having different functional characteristics, each of said measuring heads having a driving part means for engagement by a torque wrench to be tested and permitting a torque to be exerted thereon through said torque wrench, a torque sensor means for providing a sensor signal indicative of said exerted torque, and separate signal processing means for processing said sensor signals from said torque sensor to provide torque measuring data at a measuring head signal output, each of said signal processing means being located in the associated one of said measuring heads in close proximity with said torque sensor, said signal processing means of said plurality of measuring heads being calibrated to provide, at any one of said measuring head outputs, the same torque measuring data, when the same torque is exerted upon the respective one of said measuring heads, the measuring head outputs of said plurality of measuring heads being applied directly, in parallel, to display or evaluation means.

2. A testing device as claimed in claim 1, wherein at least some of said measuring heads have different measuring ranges.

3. A testing device as claimed in claim 1, wherein, in at least one of said measuring heads, said signal processing means comprise means for determining the maximum torque of a torque pulse exerted on said measuring head.

4. A testing device as claimed in claim 1, wherein said torque sensor provides analog output signals, and said signal processing means comprise A/D-converter means for converting said analog signals into digital signals.

5. A testing device as claimed in claim 4, wherein said signal processing means further comprise means for linearizing and calibrating said digital signals from said A/D-converter to provide said torque measuring data.

6. A testing device as claimed in claim 4, and further comprising means for wireless transmission of said torque measuring data appearing at said measuring head output to said display or evaluation means.

7. A testing device as claimed in claim 1, wherein at least one of said measuring heads comprises a stationary housing, said torque sensor comprising an outer annular body fixedly retained in said housing, an inner annular body connected with said outer annular body through webs, a driving part permitting exerting of a torque thereon and attached to said inner annular body, and measuring pick-up means responding to deformation of said webs under the action of said torque, said signal processing means comprise a printed circuit board, on which components of said signal processing means are mounted, said printed circuit board having a central aperture therethrough, said printed circuit board having a central aperture therethrough, said printed circuit board being arranged in a shallow cavity within said outer annular body and above said inner annular body and said webs and being attached to said inner annular body, and said driving part means extends through said central aperture of said printed circuit board.

* * * * *